United States Patent [19]

Christine

[11] Patent Number: 4,512,136
[45] Date of Patent: Apr. 23, 1985

[54] FITMENT ATTACHMENT METHODS IN HORIZONTAL FORM/FILL/SEAL MACHINES

[75] Inventor: William C. Christine, Catasauqua, Pa.

[73] Assignee: Trinity Associates, a Partnership of the State of Pennsylvania, Nazareth, Pa.

[21] Appl. No.: 410,591

[22] Filed: Aug. 23, 1982

[51] Int. Cl.³ .................... B65B 9/08; B65B 61/00
[52] U.S. Cl. .................................. 53/410; 53/450; 53/455
[58] Field of Search ............... 53/128, 129, 410, 450, 53/455, 562; 222/107; 493/210, 213, 223, 232

[56] References Cited

U.S. PATENT DOCUMENTS

| | | | |
|---|---|---|---|
| 3,245,605 | 4/1966 | Meyerhoefer | 493/210 |
| 3,246,444 | 4/1966 | Paisley | 53/450 |
| 3,599,388 | 8/1971 | Feingold | 53/455 |
| 3,894,381 | 7/1975 | Christine et al. | 53/128 |
| 4,216,639 | 8/1980 | Gautier | 53/455 |
| 4,394,936 | 7/1983 | Shavit | 222/107 |

Primary Examiner—Robert L. Spruill
Assistant Examiner—Richard M. Mudd
Attorney, Agent, or Firm—Sherman Levy

[57] ABSTRACT

The method of forming a pouch in a horizontal form-/fill/seal machine and applying a dispensing fitment to a folded edge of the pouch.

3 Claims, 8 Drawing Figures

U.S. Patent   Apr. 23, 1985   Sheet 1 of 2   4,512,136
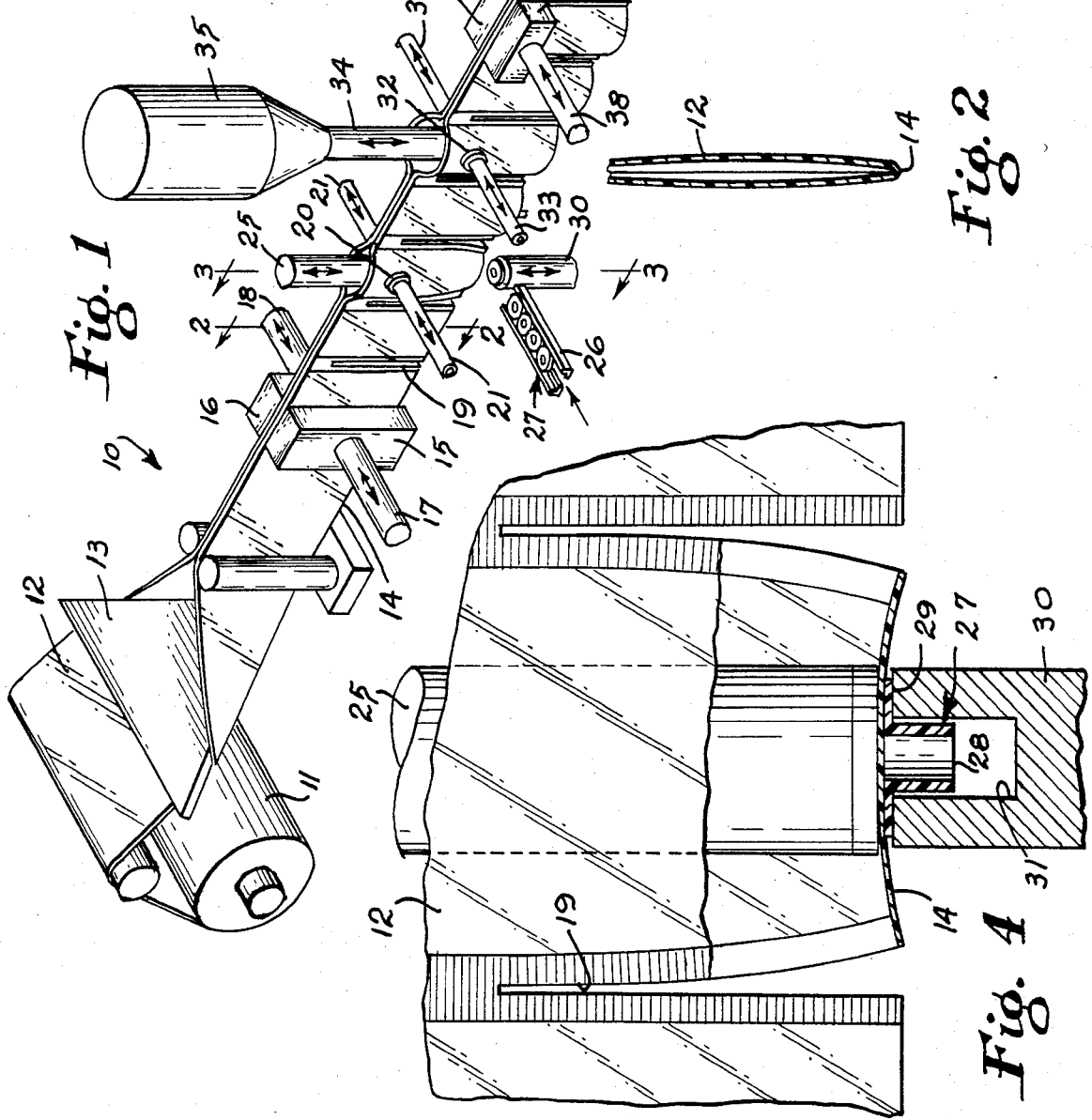

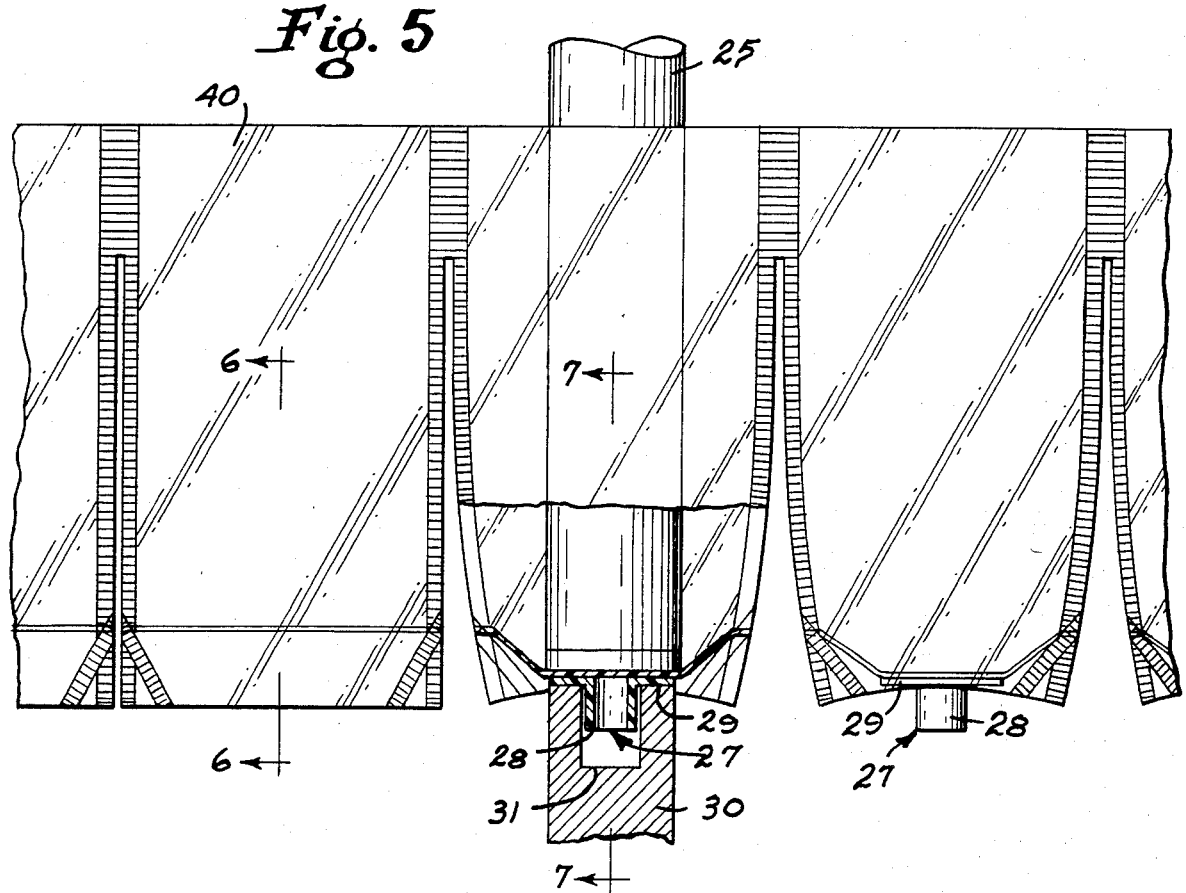
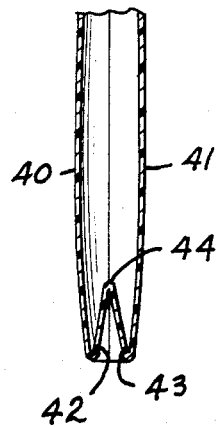
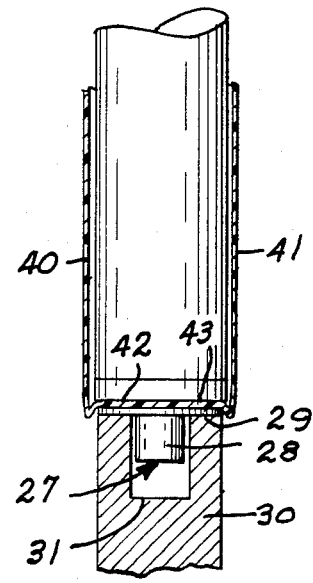
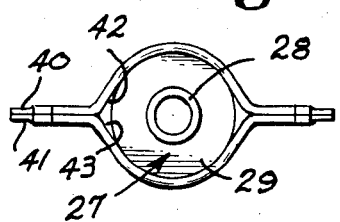

FITMENT ATTACHMENT METHODS IN HORIZONTAL FORM/FILL/SEAL MACHINES

BACKGROUND OF THE INVENTION

In the past, flexible pouches of relatively stable thermoplastic material have been provided for use in the packaging, preservation and dispensing of fluent materials such as comestible products, medicinal preparations and the like in liquid, powdery or granular form.

In most instances, the fluent material is introduced into the pouch or container after a portion of the pouch has been formed from a web of thermoplastic material of indefinite length and thereafter the pouch is sealed and separated from the web so that individual pouches may be packaged and shipped. Normally, the pouches are made and filled in a vertical form/fill/seal machine in either a continuous or intermittent operation by folding the web of thermoplastic material in half and passing the material through the vertical machine with the folded edge being disposed vertically and forming one side of the pouch. Then the edge opposite the fold is sealed to form the other side. Thereafter, a horizontal seal is made to close the top of a lower pouch and the bottom of a contiguous upper pouch and simultaneously separate the lower pouch from the web of material. The vertical form/fill/seal machine normally is preferred due to the fact that the pouches may be formed about a fixed vertically disposed former or filling tube which obviates the necessity of providing apparatus for opening the pouches for filling purposes.

Some efforts have been made to make and fill the pouches in a horizontal form/fill/seal machine; however, the problem of opening and filling the pouches has resulted in more complicated and sophisticated machinery and normally has reduced the speed of production. Some examples of this type of equipment is shown by U.S. Pat. Nos. 3,246,444 to Paisley; 3,269,278 to Olstad; 3,453,799 to Cloud et al; 3,537,225 to Fields; 3,599,388 to Feingold; 3,618,286 and 3,779,449 to Membrino; and 3,817,017 to Titchenal.

Although the preferred method of forming and filling thermoplastic pouches is in a vertical form/fill/seal machine, there are instances when such vertical machine is not satisfactory. For example, when the pouch to be made is relatively small or the longitudinal dimension of the pouch is greater than twice the dimension measured along the fold, it is preferable to form, fill and seal the pouch in a horizontal process. This is primarily due to the fact that when the fluent material is introduced into the side of an elongated relatively narrow pouch, insufficient clearance or head room is provided to permit the pouch to be properly sealed.

In a horizontal form/fill/seal machine, the fold of the material is located at the bottom of the pouch and a pair of vertical side seals are made prior to the introduction of the fluent material and the top of the pouch is sealed after the material has been introduced into the pouch.

In some instances, it is desirable to attach a material dispensing fitment to the pouch as the pouch is being formed and such fitment serves to assist in the partial or complete dispensing of the material when desired. In some cases, the fitment also serves to assist in filling the pouch. Some examples of pouches having fitments are disclosed in my copending application Ser. No. 389,099, Gussetted Bottom POuch now U.S. Pat. No. 4,452,378, and my previous U.S. Pat. Nos. 3,894,381 and 4,246,062; as well as U.S. Pat. Nos. 2,850,422 to Welch, Jr.; 2,999,387 to Andelin; 3,244,576 to Swartz; 3,554,256 to Anderson; 3,652,047 to Waage; 3,994,412 to Difiglio; and, 4,049,034 to Vcelka.

Heretofore, substantial difficulty has been encountered in attaching a fitment to the fold of a pouch being made in a horizontal form/fill/seal machine because the polymeric thermoplastic web must be reshaped to a form that will provide a flat spot that otherwise would be a fold. The web, which is being stretched flat in the machine, resists the required reshaping.

FIELD OF THE INVENTION

This invention relates generally to thermoplastic pouches which contain fluent material and relates particularly to the attaching of a fitment to the pouch as the pouch is being formed.

DISCLOSURE OF THE INVENTION

The present invention is embodied in a method of attaching a fitment to the fold of a pouch as the pouch is being formed in a horizontal form/fill/seal machine and includes the steps of at least partially separating the pouches from each other to relieve the stretching tension and then opening the pouch and reshaping the bottom thereof to accomodate a fitment which is then attached thereto.

It is an object of the invention to provide a method of attaching a fitment to the fold of a pouch as the pouch is being made in a horizontal form/fill/seal machine.

BRIEF DESCRIPTION OF THE DRAWINGS

FIG. 1 is a perspective view illustrating the method of attaching a fitment to a pouch in a horizontal form-/fill/seal machine.

FIG. 2 is an enlarged fragmentary sectional view taken on the line 2—2 of FIG. 1.

FIG. 3 is an enlarged fragmentary sectional view taken on the line 3—3 of FIG. 1.

FIG. 4 is a side elevational view of the structure of FIG. 3 with portions broken away for clarity.

FIG. 5 is a side elevational view of another type of pouch.

FIG. 6 is a sectional view taken on the line 6—6 of FIG. 5.

FIG. 7 is a sectional view taken on the line 7—7 of FIG. 5.

FIG. 8 is a bottom plan view of the pouch showing the fitment attached thereto.

DESCRIPTION OF THE PREFERRED EMBODIMENTS

With continued reference to the drawings, a horizontal form/fill/seal machine 10 is shown schematically and includes a roll 11 of relatively stable polymeric thermoplastic material 12 in a web of indefinite length. The web of material is folded substantially in half by a former 13 to provide a double thickness with a fold 14 at the bottom at a forming station.

Downstream from the forming station, a first sealing station is provided with a sealing element 15 and a backing element 16 which are mounted on rods 17 and 18 respectively. Such rods are adapted to be extended and retracted in any desired manner (not shown) so that when they are extended, the elements 15 and 16 engage the web of material to seal the thicknesses together for substantially the entire height to form the side seals of contiguous pouches and simultaneously form a slit 19 which extends from the bottom of the material upwardly a distance less than the full height thereof.

A fitment applying station is located along the path of travel of the pouches and such station includes conventional apparatus for opening the top of each pouch. As illustrated, the apparatus for opening each pouch includes a pair of opposed suction cups 20 each of which is fixed to the end of a tube 21 which communicates with a source of vacuum or suction. The tubes 21 are movable toward and away from the line of pouches so that the tubes may be extended until the suction cups 20 engage the opposed side walls of a pouch at which time a suction is applied to cause the sides of the pouch to adhere to the cups 20. Movement of the tubes away from the line of pouches causes the side walls of the pouch to spread apart. Although suction cup structure has been illustrated and described, it is contemplated that other conventional methods of opening the pouch, such as air jets or the like, may be used.

When the pouch is open, an axially movable fitment sealing element 25 is moved downwardly into the open pouch. A fitment supply track 26 has its discharge end located adjacent to the bottom fold 14 of the pouch and is adapted to supply fitments 27 one at a time to such discharge end. Normally, each fitment includes a tubular body 28 having an attaching flange 29 fixed to the upper end. An axially movable anvil 30 having a central recess 31 is adapted to receive a fitment from the track 26 after which the anvil is moved upwardly against the fold at the bottom of the pouch. During the upward movement of the anvil, the fitment first engages the fold 14 and continued upward movement causes the fold to flatten out as shown in FIG. 3. Since the polymeric thermoplastic web is substantially stable, the upward movement of the central portion of the fold causes the opposite ends to be drawn inwardly as illustrated in FIGS. 4 and 5. The ends of the fold are freely movable inwardly due to the slits 19 which relieve the fold of any pulling tension of the machine 10.

When the central portion of the fold has been flattened as wide as the flange 29 of the fitment 27, the sealing element 25 engages the inner surface of the flattened portion after which the sealing element is energized by electrical, ultrasonic or radio-frequency energy to provide heat which seals the pouch to the flange of the fitment. Thereafter, the fitment sealing element 25 and the anvil 30 are retracted and the suction on the suction cups 20 is relieved so that movement of the line of pouches may continue.

The pouch with a fitment attached to the bottom is moved to a filling station where the pouch again is opened in any desired manner such as suction cups 32 mounted on axially movable tubes 33 which are connected to a source of suction. A fill tube 34, which communicates with a hopper 35, is located above the open pouch and such fill tube may be either fixed or axially movable. A predetermined quantity of fluent material from the hopper passes through the fill tube and into the pouch and such quantity is regulated in any desired manner such as conventional valves or the like (not shown).

Thereafter, the pouch is moved to a top sealing station which includes a sealing element 36 and a backing element 37 which are mounted on extendable and retractable rods 38 and 39 respectively. The sealing element 36 seals the upper portions of the pouch together and simultaneously separates the sealed pouch from the line of pouches by severing the upper portions of the material in alignment with the slit 19. The sealed pouch then is placed on a conveyor or the like and moved to a packaging and shipping area.

With particular reference to FIGS. 2–4, the pouch is formed simply by folding the material in half and moving the same through the various stations. With particular reference to FIGS. 5–8, a modified form of pouch is provided which promotes more complete dispensing or draining of the contents of the pouch. In this embodiment, each pouch has front and rear walls 40 and 41, respectively, each of which is integrally attached to an inner reversely turned wall 42 and 43 respectively which are connected to each other along a fold 44. This type of pouch may be preferred because the reversely turned walls tend to flatten out more readily when the pouch is opened and, further, the reversely turned walls distend in the direction of the anvil so that the axial movement of the anvil is minimal. Since the side seals secure the ends of the reversely turned walls in fixed position relative to the sides of the pouch, the application of the fitment to a flattened central portion causes the bottom of the pouch to assume a natural funnel shape which promotes more complete dispensing of the contents of the pouch.

Although the methods of attaching the fitment to the pouch has been illustrated and described as being attached to the exterior of the bottom of the pouch, it is contemplated that a hole could be punched or otherwise formed in the bottom of the pouch and a fitment 27 could be inserted into the open top of the pouch so that the tubular body 28 extends downwardly through such hole. Thereafter, the attaching flange 29 would be sealed to the bottom of the pouch as previously described except that such flange would be located within the pouch instead of exteriorly thereof.

While several embodiments of the present invention have been illustrated herein in particular detail, it will be understood that variations and modifications may be effected without departing from the spirit and scope of the novel concepts of this invention.

I claim:

1. A method of attaching fitments to a pouch of thermoplastic material in a horizontal form/fill/seal machine comprising the steps of: first folding a web of material substantially in half in a longitudinal direction with the fold being lowermost, and moving said material horizontally, next sealing said web vertically at spaced intervals to provide a plurality of pouches, at least partially slitting said seals with the slit extending upwardly from said fold, separating the opposite side walls of each pouch, moving a fitment against said lowermost fold surface of said pouch and causing said surface to flatten against said fitment, then applying a fitment sealing element against the flattened portion of said fold surface and heating at least one fitment and said fold surface to cause intimate bonding therebetween, said slits permitting the portions of said pouch to move toward each other.

2. The method as defined in claim 1 including the step of: moving the fitment against the exterior surface of said fold against the pouch, and then inserting the fitment sealing element into said pouch.

3. The method of claim 1 including the steps of: introducing fluidic material into said pouch, and finally sealing said pouch.

* * * * *